Patented June 21, 1938

2,121,680

UNITED STATES PATENT OFFICE 2,121,680

COATING COMPOSITIONS

James A. Arvin, Chicago, Ill., assignor to E. I. du Pont de Nemours & Company, Wilmington, Del., a corporation of Delaware No Drawing. Application August 1, 1935, Serial No. 34,302

5 Claims. (Cl. 91—68)

This invention relates to the art of coating and more particularly to articles of manufacture provided with a protective coating which is highly resistant to acids, alkalis and other deteriorating agents.

This case is a continuation in part of my Patent No. 2,060,715. This patent claims new resins known as ether resins and discloses valuable coated products which are claimed here.

This invention has as an object the manufacture of products having rigid surfaces protected with a coating which is highly durable upon outdoor exposure and which is substantially chemically inert and practically unaffected by prolonged contact with moisture, acids, alkalis, and aliphatic hydrocarbon solvents. A further object is to provide improved metal products of the kind just mentioned. A still further object is to provide new and useful coating compositions particularly adapted for coating metal or other articles having rigid surfaces. Other objects will appear hereinafter.

In the preferred method of carrying out my invention I coat the steel or other article having a rigid surface with a solution of polyether resin and bake the coated object to remove the last traces of solvent from the polyether resin film. The coating may, however, be allowed to dry at room temperature.

The polyether resins referred to herein, which consist essentially of ether linkages, are obtained in accordance with the disclosure in the above mentioned patent by reacting in resinifying proportions substantially unpolymerizable monomeric polyhydric phenols, or their alkali and alkaline metal salts, with organic polyhalides free of ester groups whose halogen atoms are all attached to different carbon atoms which are in turn joined to other atoms by single bonds only. A preferred type of polyether resin is the alkaline reaction product of a dihydric polynuclear phenol of the general formula

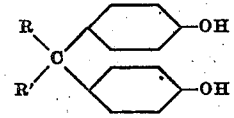

(R being hydrogen, alkyl or aryl, and R' being alkyl or aryl) and an organic compound having two halogen atoms attached to different carbon atoms, said carbon atoms being joined to other atoms by single bonds only.

The following examples illustrate the practice of my invention:

Example I

A sanded steel panel was coated with a 37% toluene solution of the polyether resin described below, the coated panel allowed to stand for two hours at room temperature, and then baked for one hour at 250° F. After one year's exposure the panel was examined and the film found to be in good condition, having afforded the steel excellent protection against rusting. Control panels put out at the same time but finished with an oil modified polyhydric alcohol-polycarboxylic acid resin, oil type varnish, and pyroxylin lacquer, respectively, showed rusting of the steel after eight, fifteen, and twelve weeks' exposure. After two years' exposure, the polyether resin panel was still in good condition, while at this time the controls had failed.

The resin of the foregoing example was made as follows:

| | Parts |
|---|---|
| Di(4-hydroxyphenyl) dimethylmethane (M. P. 157° C.) | 456 |
| β,β'-dichlorodiethyl ether | 286 |
| Water | 450 |
| Sodium hydroxide (50% aqueous solution) | 326 |

The above mixture is refluxed in an atmosphere of nitrogen for 10–15 hours with stirring or until a few drops of clear distillate shows that there is no remaining free halide. The water is distilled off over a period of two hours, the temperature finally being carried to 225–230° C. and maintained at this point for 12 hours. The mass is now very viscous and pasty. It is poured while hot into a steam-jacketed Werner-Pfleiderer mixer, washed with water, then with small portions of dilute hydrochloric acid until the washings are acid to Congo red and finally with water again until the washings are substantially free of chloride ion. The product is then dried by heating in vacuo at 120–125° C. for 16 hours. The resin is hard, clear, pale-colored and extremely tough, and is inert to acids, alkalis, water and light. It is insoluble in alcohol and aliphatic hydrocarbons, but soluble in toluene, xylene, and in aromatic esters such as dibutyl phthalate. Films dry to a hard, non-tacky condition in a very few minutes by simple evaporation of solvent; in this respect, the resin resembles cellulose derivatives. The resin does not mix readily with oils and most cellulose derivatives, but is compatible with benzyl cellulose. The resin does not heat-harden (like a phenol-formaldehyde resin) nor dry by oxidation (like a drying oil modified polyhydric alcohol-polycarboxylic acid resin).

Example II

A 25% solution of the polyether resin described below in a 1:1 ethylene dichloride-chlorobenzene solvent mixture was brushed on sanded steel, and the coated panel baked for one hour at 149° C. After 12 months' exposure the polyether resin film was still in good condition, while controls of oil type finishes, oil modified polyhydric alcohol-polycarboxylic acid resins, and pyroxylin lacquers had failed.

The resin of the above example was made as follows:

| | Parts |
|---|---|
| Di(4-hydroxy-3-methylphenyl)dimethylmethane | 448 |
| $\beta,\beta'$-dichlorodiethyl ether | 250 |
| Sodium hydroxide (50% aqueous solution) | 286 |
| Water | 415 |

The above mixture is refluxed and stirred for 10 hours, or until a few drops of distillate are clear upon cooling. The reflux condenser is then replaced by a downward condenser and the water distilled off over a period of 2 hours, the temperature meanwhile being carried to 225-230° C. By maintaining in this range for 12 hours, a viscous, opaque mass is obtained. It is poured while hot into a steam-jacketed Werner-Pfleiderer mixer, washed with water, then with small portions of dilute hydrochloric acid until the washings are acid to Congo red, and finally with more water until the washings are substantially free of chloride ions. The product is then dried by heating at 130° C. in vacuo for 16 hours. A pale, tough resin is obtained which is soluble in toluene and insoluble in alcohol. Films thereof dry rapidly to a hard non-tacky condition by simple evaporation of solvent.

Example III

To a solution of 160 parts of the resin of Example I in 258 parts of xylene was added a mixture of 7 parts of carbon black and 55 parts of silumite, and the mixture ground in a ball mill for 48 hours. This paint was brushed on steel and exposed for one year to corrosive atmospheres, e. g., hydrogen chloride, sulfur dioxide, chlorine, etc., at the end of which time the steel showed no evidences of rusting. Controls of oil modified polyhydric alcohol-polycarboxylic acid resins and pyroxylin lacquers exposed at the same time to the same conditions had completely failed at the end of this period of exposure.

Example IV

A paint was made by grinding 5 parts of carbon black in 109 parts of a 36% xylene solution of the resin of Example I, and sprayed both over wood and over primed steel. At the end of one year's exposure the panels were examined and the films found to be in good condition.

Example V

A paint was made by grinding 31 parts of titanium oxide in 114 parts of a 35% xylene solution of the resin of Example I, and sprayed both over steel and over wood. After one year's exposure to the weather the panels were examined, and found to be in good condition.

Another particularly useful application of my invention is the manufacture of metal products provided with a top coating of synthetic drying oil, e. g., that disclosed and claimed in U. S. Patent 1,812,849, made adherent by means of a poly-ether resin undercoat.

Example VI

Galvanized iron sheeting was dipped into a 30% xylene solution of the polyether resin described below, the coated sheeting allowed to stand at room temperature for 2 hours, and then baked for one hour at 149° C. Over this polyether resin coating was superposed a coating of the synthetic drying oil of Example I in U. S. Patent 1,812,849 and the system air-dried. After twelve months' exposure the film was in good condition, and there was no evidence of separation of the synthetic drying oil topcoat from the metal surface, whereas in a similarly prepared panel but without the intermediate coat of polyether resin separation of the synthetic drying oil coating from the metal surface occurred after approximately two weeks exposure.

Example VII

A pigmented polyether resin varnish of the following composition:

| | Parts by weight |
|---|---|
| Lead chromate | 39.1 |
| Asbestine | 7.9 |
| China clay | 5.2 |
| Polyether resin of Example I | 17.5 |
| Toluene | 20.0 |
| Xylene | 20.0 | was prepared by grinding the pigment mixture for 24 hours in the solution of polyether resin in the toluene-xylene solvent mixture. This varnish was brushed on a sanded steel panel, and the system allowed to stand at room temperature for 24 hours, after which time it was coated with a pigmented synthetic drying oil varnish of the following composition:

| | Parts by weight |
|---|---|
| Synthetic drying oil of Example I in U. S. Patent 1,812,849 | 20.0 |
| Silca silica | 45.0 |
| Asbestine | 15.0 |
| Indigo | 0.6 |
| Solvent naphtha | 5.0 |
| Turpentine | 15.0 |
| | 100.6 |

The pigmented synthetic drying oil coating was allowed to dry for four hours at room temperature, and then an unpigmented coating of the synthetic drying oil of Example I in U. S. Patent 1,812,849 applied by brushing from a 61.54% solution thereof in a solvent mixture comprised of 23.08% turpentine and 15.38% solvent naphtha, and after drying overnight at room temperature exposed outdoors. After twelve month's exposure there was no evidence of separation of the synthetic drying oil coatings from the substrate, whereas in a similarly prepared panel but without the polyether resin priming coat the synthetic drying oil coatings separated from the metal after approximately two weeks' exposure.

Any of the resins disclosed in the previously identified patent, or in Patents Nos. 2,060,716, 2,057,676, and 2,058,510, may replace those mentioned in the examples.

In place of the steel substrate of the examples, I may use other substrates such as galvanneal, brass, copper, aluminum, Dow metal, stainless steel, Dural, terneplate, bonderized steel, marble, stone, plaster, glass, or molded synthetic resins.

Organic solvents such as benzene, chloroform, beta,beta'-dichlorodiethyl ether, monoethylether of ethylene glycol, ethoxy-ethyl-acetate, propylene oxide, cyclohexanone, benzyl alcohol, methylal, etc., may be used as partial or total substitutes for the solvents of the examples.

While in the examples polyether resins have been used, in some cases there may be employed coatings containing in addition to the polyether resin one or more of the following ingredients: phenol-aldehyde resins, chlorinated diphenyls, cellulose ethers and esters, cumar, rosin, chlorinated naphthalenes, damar, methyl methacrylate resin, acrylic ester polymers, oil modified polyhydric alcohol-polycarboxylic acid resins, bitumens, etc.

Pigments and fillers may be added to the polyether resin coatings of this invention as needed and desired. Among suitable pigments and fillers for use are the chrome greens, iron blues, chrome yellows, zinc oxide, titanium oxide, china clay, asbestine, silica, etc.

Softeners and plasticizers may be added to these polyether resin coating compositions as typified by the following: diamyl phthalate, dibutyl phthalate, diamyl tartrate, cyclohexyl butyl phthalate, dicyclohexyl phthalate, cyclohexyl tartrate, benzyl butyl phthalate, hexahydrobenzyl phthalate, dibutyl succinate, dicyclohexyl succinate, tricyclohexyl phosphate, tricresyl phosphate, dixylylethane, butyl benzoyl benzoate, etc.

The coatings of this invention may be applied by any well known method, e. g., dipping, spraying, spreading, and roller coating. A particularly advantageous way of applying these coatings is by means of preformed films of the resin in which a precast polyether resin film is superposed on the object to be coated, and the film laminated to the substrate by means of heat and pressure. In this manner coatings of any desired thickness and of remarkable uniformity are obtained. As disclosed in my previously mentioned patent, the resins in thin sheets are not only self-supporting but are remarkably tough, tear resistant, and flexible.

The polyether resin coatings of this invention may be used in single or two coat systems, and in the latter instance the other coating may be an oleoresinous varnish, asphalt varnish, cellulose derivative lacquer, etc. I generally prefer to bake the polyether resin coating when it forms the topcoating, because otherwise optimum results with respect to durability, adhesion, moisture-resistance, and resistance to weak acids, alkalis, and aliphatic hydrocarbons is not obtained.

By means of the present invention highly useful products are made having either a single coat of the polyether resin or provided with a two coat system in which the topcoat or undercoat is the polyether resin, the other coat being any other suitable coating material. Specific applications in which polyether resin coatings are particularly useful include protective finishes for steel beer barrels, refrigerator finishes (both as primers and topcoats), coatings for the interior of fountain pens to protect the barrel from the action of alkali contained in the ink, acid resisting paints for metal containers, alkali resistant finishes for condenser boxes and motors, waterproofing shot shell lacquers, lacquers for food containers, durable clears over pyroxylin and other cellulose derivative finishes, durable clears over oil varnish and oil modified polyhydric alcohol-polycarboxylic acid resin coatings, clear finishes for the protection of decorative metal surfaces, as well as for marble and polished stone surfaces, single coat, air-dry, or baking enamels of high solids and high hiding power for general industrial use, alcohol resistant furniture lacquers, linoleum finishes, finishes for vitreous enamels, protective coatings for glass, porcelain, etc., nail polishes, ship bottom paints, as waterproofing coatings for plaster, concrete, and granite, clears over sheet steel to prevent rusting prior to fabrication, as anticorrosive paints for chemical containers, for general industrial use where resistance to acids and alkalis, etc., is required, gasoline-resistant paints for the interior of gasoline tanks, as sealer coatings for porous building blocks, etc.

The superiority of the products of the present invention over those of similar type finished with oleoresinous varnishes or other usual metal protective finishes is particularly evident in applications where the finish is either under continuous exposure to corrosive atmospheres or to the action of weak acids, alkalis, petroleum oils, gasoline, alcohol, etc. Under these conditions polyether resin finishes remain substantially unchanged after prolonged exposure, whereas the usual metal protective finishes soon disintegrate and leave the metal surface completely unprotected. Another very important advantage of polyether resin coatings over the usual type of metal protective finishes is their remarkable water-resistance, as evidenced by the fact that they are substantially unaffected by prolonged soaking in water, whereas the usual type of metal protective finish is generally softened and lifted under these conditions. As metal primers polyether resins give stronger and more permanent bonds than the usual type of metal primer, particularly over galvanized iron.

As many apparently widely different embodiments of this invention may be made without departing from the spirit and scope thereof, it is to be understood that I do not limit myself to the specific embodiments thereof except as defined in the appended claims.

I claim:

1. An article of manufacture which comprises a rigid body coated with a composition comprising a non-heat hardening resin consisting essentially of ether linkages, said resin comprising the reaction product of a substantially unpolymerizable monomeric polyhydric phenol and an organic polyhalide free of ester groups whose halogen atoms are all attached to different carbon atoms which are in turn joined to other atoms by single bonds only.

2. An article of manufacture having a rigid surface carrying a coating comprising the resin defined in claim 1.

3. As an article of manufacture metal carrying a coating comprising the resin defined in claim 1.

4. As an article of manufacture metal having an adherent film of the resin defined in claim 1 and a top coat comprising a hardened film of divinyl acetylene polymer.

5. Galvanized iron having an adherent undercoat of resin defined in claim 1 and a top coat comprising a hardened film of divinyl acetylene polymer.

JAMES A. ARVIN.